(12) United States Patent
Solomon (10) Patent No.: US 11,741,823 B2
(45) Date of Patent: Aug. 29, 2023

(54) DISTRESS ALERT SYSTEMS AND PROCESSES RELATED THERETO

(71) Applicant: PELAGIC DATA SYSTEMS, INC, San Francisco, CA (US)

(72) Inventor: David Belu Solomon, San Francisco, CA (US)

(73) Assignee: PELAGIC DATA SYSTEMS, INC, San Francisco, CA (US)

( * ) Notice: Subject to any disclaimer, the term of this patent is extended or adjusted under 35 U.S.C. 154(b) by 27 days.

(21) Appl. No.: 17/575,668

(22) Filed: Jan. 14, 2022

(65) Prior Publication Data

US 2022/0139206 A1 May 5, 2022

Related U.S. Application Data

(63) Continuation-in-part of application No. 16/764,389, filed as application No. PCT/US2018/061159 on Nov. 15, 2018, now Pat. No. 11,254,400.

(60) Provisional application No. 62/586,174, filed on Nov. 15, 2017.

(51) Int. Cl.
| | |
|---|---|
| *B63C 9/00* | (2006.01) |
| *G08B 25/10* | (2006.01) |
| *H04W 76/50* | (2018.01) |
| *G08B 21/10* | (2006.01) |
| *G08B 25/00* | (2006.01) |
| *H04W 4/40* | (2018.01) |
| *H04W 4/90* | (2018.01) |

(52) U.S. Cl.
CPC .............. *G08B 25/10* (2013.01); *G08B 21/10* (2013.01); *G08B 25/007* (2013.01); *H04W 76/50* (2018.02); *H04W 4/40* (2018.02); *H04W 4/90* (2018.02)

(58) Field of Classification Search
CPC ....... G01S 19/17; G08B 25/009; G08B 25/10; B63C 9/00; B63C 2009/0017; H04W 76/50
See application file for complete search history.

(56) References Cited

U.S. PATENT DOCUMENTS

2009/0079590 A1* 3/2009 Hiraoka ................ G01S 3/8083
340/984

* cited by examiner

*Primary Examiner* — Benyam Haile
(74) *Attorney, Agent, or Firm* — EcoTech Law Group, P.C.

(57) ABSTRACT

Systems and processes for initiating a rescue, using peer-to-peer distress alert systems, are described. An exemplar process of initiating, from a distressed vessel, a recce includes: (i) generating an outgoing distress signal that includes a distress signal and distressed vessel location information; (ii) broadcasting the outgoing distress signal to one or more potential rescue vessels located away from the distressed vessel; (iii) receiving, from one or more of the potential rescue vessels, one or more outgoing rescue signals, each of which includes potential rescue vessel location information; (iv) of identifying, using the potential rescue vessel location information from one or more of the potential rescue vessels and vessel location information of the distressed vessel, one or more rescue potential rescue vessels that are suitable for rescuing the distress vessel; and (v) transmitting, from the distressed vessel, a confirmation rescue signal to each of the potential rescue vessels that are suitable for rescuing the distress vessel.

8 Claims, 5 Drawing Sheets

DISTRESS ALERT SYSTEMS AND PROCESSES RELATED THERETO

RELATED APPLICATION

The present application is a continuation of U.S. patent application Ser. No. 16/764,389 which was filed on May 15, 2020 which is a national-phase entry of PCT/US2018/061159, filed on Nov. 15, 2018, which in turns claims priority from U.S. Provisional Application having Ser. No. 62/586,174 filed on Nov. 15, 2017, which are incorporated herein by reference for all purposes.

FIELD

The present invention generally relates to distress alert system. More particularly, the present invention relates to novel systems and process of a peer-to-peer distress alert system.

BACKGROUND

Conventional vessel distress alert systems require costly computing systems that, when engaged, communicate with a rescue service and/or command centers and notify certain rescue entities of a distressed vessel. However, these computing systems do not notify nearby vessels of the distressed vessel to enable the nearby vessels to assist the distressed vessel.

What are, therefore, needed are improved systems and processes to notify nearby vessels that a vessel is in distress in a simple and cost-effective manner.

SUMMARY

To achieve the foregoing, the present teachings provide novel systems and methods of a peer-to-peer distress alert system that allows a distressed vessel to directly broadcast a rescue request to one or more potential rescue vessels. In one aspect, the present teachings provide processes for initiating a rescue. An exemplar process for initiating a rescue includes: (i) generating, at a distressed vessel, an outgoing distress signal that includes a distress signal and distressed vessel location information. The distress signal includes at least one information type chosen from a group comprising nature of distress at the distressed vessel, vessel type of the distressed vessel, number of persons on the distressed vessel, and identification code of the distressed vessel. Another step (ii) involves broadcasting, from the distressed vessel, the outgoing distress signal to one or more potential rescue vessels located away from the distressed vessel. Next a step (iii) includes receiving at the distressed vessel, from one or more of the potential rescue vessels, one or more outgoing rescue signals. Each of the outgoing rescue signals includes potential rescue vessel location information. The potential rescue vessel location information includes at least one information type chosen from a group comprising vessel type of the potential rescue vessel, personnel capacity of the potential rescue vessel, identification code of the potential rescue vessel, fuel level of the potential rescue vessel and top speed of the potential rescue vessel. The process further includes a step (iv) of identifying, at the distressed vessel, one or more rescue potential rescue vessels that are suitable for rescuing the distress vessel. Each potential rescue vessel is identified using the potential rescue vessel location information from one or more of the potential rescue vessels and vessel location information of the distressed vessel. Another step (v), includes transmitting, from the distressed vessel, a confirmation rescue signal to each of the potential rescue vessels that are suitable for rescuing the distress vessel.

The step of identifying one more potential rescue vessels that are suitable for rescuing the distressed vessel, in one embodiment of the present teachings, includes: (i) computing a difference between the distressed vessel location information and the potential rescue vessel location information to arrive at a difference value; and (ii) carrying out the transmitting of the confirmation rescue signal, if the difference value is lower than a predefined threshold value or carrying out the transmitting of the denial rescue signal, if the difference value is higher than the predefined threshold value. Preferably, the predefined threshold value is a value that ranges from about 0.1 miles and about 25 miles.

The step of identifying one more potential rescue vessels that are suitable for rescuing the distressed vessel, in another embodiment of the present teachings, includes: (i) computing a difference between the distressed vessel location information and the potential rescue vessel location information to arrive at a difference value; and (ii) carrying out the transmitting of the confirmation rescue signal to the potential rescue vessel with a smallest difference value.

The step of generating the outgoing distress signal includes: (i) engaging a distress signal generator, located on a distressed vessel, to an produce intermittent or continuous distress signal to convey that the distressed vessel is in distress; (ii) receiving, at a microprocessor located on the distressed vessel, the distress signal; (iii) retrieving, from a location information component located on the distressed vessel, the distressed vessel location information; (iv) coupling, using the microprocessor, the distress signal with the distressed vessel location information to produce the outgoing distress signal; and (v) conveying, from the microprocessor, to a transmitter or the location information component, the outgoing distress signal.

In one embodiment of the present teachings, the process further includes transmitting, from the distressed vessel, a denial rescue signal to one more potential rescue vessels that are not suitable for rescuing the distress vessel. The process may further include broadcasting, from the distressed vessel, the outgoing distress signal and/or the confirmation rescue signal to a land-based entity.

In another aspect, the present teachings provide processes for processing an outgoing distress signal. One exemplar process for processing an outgoing distress signal includes: (i) receiving, at a receiver located on a potential rescue vessel, the outgoing distress signal, wherein the outgoing distress signal includes a distressed vessel location information. A step (ii) includes extracting, using a microprocessor located on the potential rescue vessel, the distressed vessel location information from the outgoing distress signal. Next, as step (iii) includes comparing, using the microprocessor, the distressed vessel location information with a potential rescue vessel location information to arrive at a distance value. The potential rescue vessel location information conveys location information of the potential rescue vessel. In one embodiment of the present teachings, the microprocessor compares latitude and/or longitude information contained in the potential rescue vessel location information to latitude and/or longitude information contained in the distressed vessel location information to ascertain the distance value and/or a direction of emanation of the outgoing distress signal. Another step (iv) involves determining if the distance value is within a predefined threshold value. The process proceeds to step (v). This step (v) involves transmitting, when the distance value between the potential rescue vessel and distressed vessel is lower than the predefined threshold value, an outgoing rescue signal to the distressed vessel to confirm that the potential rescue vessel is capable of rescuing the distressed vessel. Step (v) also involves transmitting, when the distance value between the potential rescue vessel and distressed vessel is higher than the predefined threshold value, a denial rescue signal to the distressed vessel to convey that the potential rescue vessel is not capable of rescuing the distressed vessel.

The process, in one embodiment of the present teachings, includes storing, using memory, a plurality of location information of emanation of a plurality of the outgoing distress signals to identify high risk locations that have multiple outgoing distress signals. The process, in another embodiment of the present teachings, includes storing and/or transmitting the confirmation rescue signal to a land-based entity. The process, in yet another embodiment of the present teachings, includes transmitting a rescue signal confirmation confirming that the potential rescue vessel will attempt a rescue of the distressed vessel.

The systems and processes of operation of the present teachings and arrangements, however, together with additional objects and advantages thereof, will be best understood from the following descriptions of specific embodiments when read in connection with the accompanying figures.

DETAILED DESCRIPTION OF THE PREFERRED EMBODIMENTS

In the following description, numerous specific details are set forth in order to provide a thorough understanding of the present teachings and arrangements. It will be apparent, however, to one skilled in the art that the present teachings and arrangements may be practiced without limitation to some or all of these specific details. In other instances, well-known process steps have not been described in detail in order to not unnecessarily obscure the present teachings and arrangements.

Many vessels (e.g., small fishing boats) lack systems and processes that quickly allow vessel-to-vessel communication between a distressed vessel and other nearby vessels. The vessels may be in communities that are not supported by intermediary rescue systems, such as third party regional or national rescue organizations (e.g., a coast guard or navy) that coordinate rescue efforts from a command post or earth station and have vessels that perform rescues. Moreover, conventional rescue systems are cost prohibitive to buy, install, and maintain. The present arrangements and teachings relate to novel distress alert systems and processes that allow a distressed vessel to notify other vessels that the distressed vessel is in need of rescue and provide a location of the distressed vessel. In addition, the distress alert systems and processes allow a potential rescue vessel to receive a distress signal from a distressed vessel and identify the direction of a distressed vessel. The distress signal is transmitted directly between the distressed vessel and potential rescue vessels. In other words, the transmission is performed without the intermediary rescue system. Thus, each boat may rely on other nearby boats to assist in a potential rescue rather than an intermediary third-party system that directs designated rescue vessels to the location of the distressed vessel.

Figure 1:
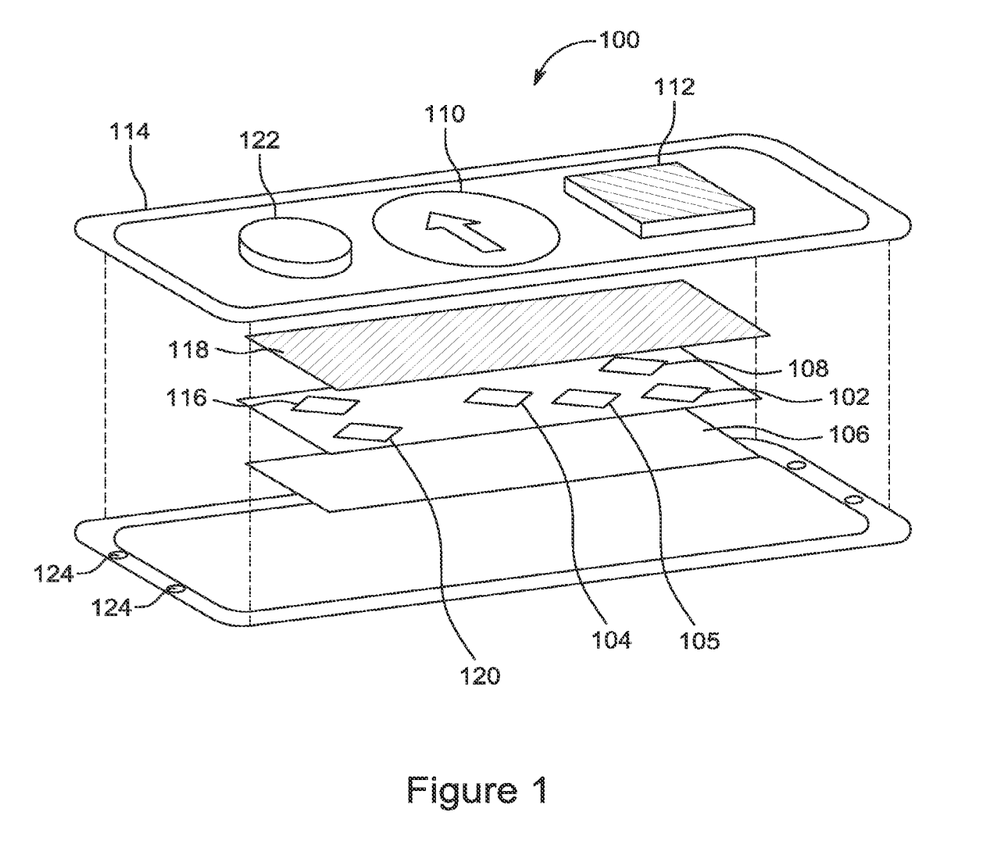
FIG. 1 shows a distress alert system, according to one embodiment of the present arrangements and that may generate an outgoing distress signal, which indicates that a distressed vessel is in distress, and/or may receive an outgoing distress signal from another distressed vessel.

FIG. 1 shows a distress alert system 100, according to one embodiment of the present arrangements. Distress alert system 100 is configured to receive an outgoing distress signal from a distressed vessel and broadcast an outgoing distress signal to other vessels. Distress alert system 100 includes various components contained inside a sealed waterproof enclosure 114. These components may be chosen from a group comprising transmitter 102, microprocessor 104, memory 105, battery 106, receiver 108, distress signal display 110, distress signal generator 112, location information component 116, solar cell or panel 118, one or more sensors 120, and rescue confirmation generator 122. Distress alert system 100 may be secured to a vessel using attachment points 124.

Transmitter 102 and receiver 108 are communicatively coupled to microprocessor 104. Transmitter 102 and receiver 108 allow distress alert system 100 to communicate with one or more other distress alert systems. On a distressed vessel, transmitter 102 continuously or in intermittingly transmits, or broadcasts, an outgoing distress signal and/or confirmation rescue signal to one or more distress alert systems 100. As will be discussed in greater detail below a confirmation rescue signal is only sent to potential rescue vessels that have suitable traits (e.g., within a predefined proximity from the distressed vessel) for rescuing the distressed vessel. In one embodiment of the present arrangements, transmitter 102, of one distress alert system 100, transmits information directly to receiver 108 of another distress alert system 100. In another embodiment of the present arrangements, transmitter 102, of one distress alert system 100, transmits information to an intermediary communication device (e.g., a satellite or another vessel), which then transmits the information to a receiver 108 of another distress alert system 100. On a distressed vessel, receiver 108 receives one or more outgoing rescue signals from one or more different potential rescue vessels. On a potential rescue vessel, receiver 108 may receive an outgoing distress signal from a distressed vessel.

Microprocessor 104 performs numerous tasks within distress alert system 100. When distress alert system 100 is located on a distressed vessel, microprocessor 104 generates outgoing distress signals for transmission, from the distressed vessel, to one or more potential rescue vessels and generates outgoing rescue signals and/or confirmation rescue signals for transmission, from a potential rescue vessel, to the distressed vessel. Moreover, microprocessor 104 analyzes one or more outgoing rescue signals to determine if any potential rescue vessels are suitable for rescuing the distressed vessel. When distress alert system 100 is on potential rescue vessel, microprocessor 104 determines if the potential rescue vessel is close enough to the distressed vessel to be a candidate for rescuing the distressed vessel.

In one embodiment of the present arrangements, microprocessor 104 of a distressed vessel directs memory 105 to distressed vessel store location information when distress signal generator 112 is activated. Additionally, memory 105 of a potential rescue vessel may store distressed vessel location information, which is part of the outgoing distress signal. Distressed vessel location information stored in memory 105 may later be retrieved from one or more vessels to generate a database of distressed vessel locations. This information may be used to identify a location of high risk where numerous distress locations have occurred.

In another embodiment of the present arrangements, microprocessor 104 executes software stored in memory 105 that transforms distress signals, received from distress signal generator 112 and/or location information component 116, into an encoded data packet(s). The transferrable data packet(s) allow distress alert system 100 to transmit the information in a form that is smaller in size than the original information, which allows for faster transmission to another distress alert system 100.

Solar cell or panel 118 may be used to power distress alert system 100 and/or recharge battery 106. Furthermore, battery 106 may be used to supplement power to distress alert system 100 when solar cell or panel 118 does not produce enough power, for example, when clouds prevent full sun exposure to solar cell or panel 118. Software, stored in memory 105 and executed by microprocessor 104, may be used to determine which energy source to use to extend the power available to distress alert system 100.

Distress signal display 110 displays a direction of a distressed vessel when distress alert system 100 receives a distress signal and/or confirmation rescue signal from a distressed vessel. Distress signal display 110 may be any component that audibly or visually discloses that a vessel is in distress and the direction of the distress signal. By way of example, distress signal display 110 may show an arrow that indicates the direction of the distressed signal. In one embodiment of the present teachings, distress signal display 110 includes the direction of the distress signal and the distance between the potential rescue vessel receiving the distress signal and the distressed vessel. Distress signal display 110, on a distressed vessel, in one embodiment of the present arrangements, audibly or visually discloses that a potential rescue vessel is traveling to the distressed vessel.

In one embodiment of the present arrangements, distress signal generator 112 includes an activating feature and a deactivating feature. When the activating features is engaged, distress signal generator 112 generates, continuously or in intermittingly, a distress signal that conveys that a vessel is in a distressed state. When the deactivating feature is engaged, distress signal generator 112 does not generate an outgoing distress signal. Distress signal generator 112 may be any component that has an activating feature and/or a deactivating feature (e.g., one or more buttons, knobs, dials, and switches).

Location information component 116 (e.g., a global positioning system ("GPS") receiver/transmitter) is capable of receiving and/or transmitting information relating to the location (e.g., longitude and latitude) of a vessel on which distress alert system 100 attached. In one embodiment of the present arrangements, time (e.g., time of day and date) is associated with the vessel location information. To ensure a high accuracy of the vessel location information, location information component 116 receives vessel location information from one or more location information satellites (e.g., one or more GPS satellites orbiting the earth). The frequency at which location information component 116 receives the vessel location information may be adjusted based on certain parameters, for example, the accuracy of the path the vessel travels over a period of time.

Location information component 116 may also receive and transmit, in one embodiment of the present arrangements, communications (e.g., an outgoing, distress signal, an outgoing rescue signal, a denial rescue signal, and/or a confirmation rescue signal) between two different distress alert systems 100. Location information component 116 may be programmed to retrieve the location of distress alert system 100 contiguously or at various intervals of time.

One or more sensors 120 continuously or intermittently monitor distress alert system 100 and/or the vessel on which distress alert system 100 is attached to identify a distress event. If one or more sensors 120 identify a distress event, one or more sensors 120 automatically transmits a distress signal to microprocessor 104. One or more sensors 120 may be any sensor chosen from a group comprising temperature sensor, smoke detecting sensor, carbon dioxide sensor, carbon monoxide sensor, gyroscope sensor, and water sensor. Thus, one or more sensors 120 allow for transmission of an outgoing sensor signal even if personnel on the vessel are incapable of engaging distress signal generator 112. By way of example, if personnel on a vessel are incapacitated due to carbon monoxide poisoning, a carbon monoxide sensor, upon measuring a carbon monoxide level exceeds a predefined threshold, transmits a distress signal to microprocessor 104.

Rescue confirmation generator 122 includes an activating feature and a deactivating feature. When the activating features is engaged, rescue confirmation generator 122 generates, continuously or in intermittingly, a rescue signal that conveys that a potential rescue vessel is going to rescue the distressed vessel. When the deactivating feature is engaged, distress signal generator 122 does not generate a rescue signal. Distress signal generator 112 may be any component that has an activating feature and/or a deactivating feature (e.g., one or more buttons, knobs, dials, and switches).

Distress alert system 100 further includes, one embodiment of the present arrangements, a communication component for communication between distress alert system 100 and a remote storage device, preferably in a bidirectional manner. In one embodiment of the present arrangements, information transferred between distress alert system 100 to the remote storage device includes at least one type of information chosen from a group comprising vessel identification information, information about persons pertaining to a vessel, information about equipment used on vessel, weather, bathymetry, tides, water currents, wind speeds, and current and/or past locations of one or more vessels.

The communication component may be any device capable of transmitting information from distress alert system 100 to a remote storage device, satellites or nearby earth stations, which are coupled to a rescue service and/or command centers (e.g., coast guard, navy, and emergency responders). These entities may also partake in a rescue effort. In one preferred embodiment of the present arrangements, the communication component is a cellular radio. In another preferred embodiment of the present arrangements, the communication component a wireless router.

Figure 2:
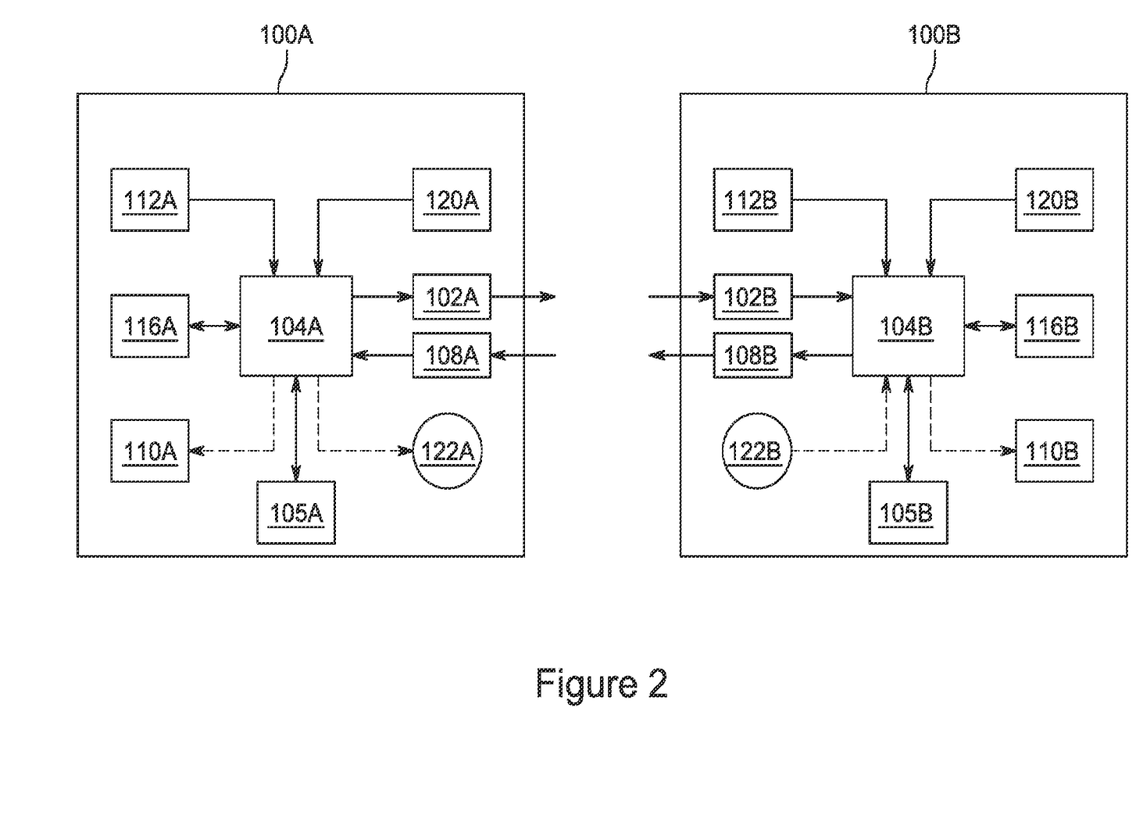
FIG. 2 show a first distress alert system, which located on distressed vessel and is configured to generate and broadcast an outgoing rescue signal, and a second distress alert system, which is located on a potential rescue vessel and is configured to receive the outgoing rescue signal from the distressed vessel, and wherein the first distress alert system and second distress alert system are substantially similar to the distress alert system of FIG. 1.

FIG. 2 shows a first distress alert system 100A located on a distressed vessel and a second distress alert system 100B located on a potential rescue vessel. Second distress alert system 100B is configured to receive an outgoing distress signal from first distress alert system 100A. First distress alert system 100A and second distress alert system 100B are substantially similar to distress alert system 100 of FIG. 1 (i.e., transmitters 102A and 102B, microprocessors 104A and 104B, memory 105A and 105B, receivers 108A and 108B, distress signal displays 110A and 110B, distress signal generators 112A and 112B, location information components 116A and 116B, one or more sensors 120A and 120B, and rescue confirmation generators 122A, and 122B are substantially, similar to their counterparts transmitter 102, microprocessor 104, memory 105, receiver 108, distress signal display 110, distress signal generator 112, location information component 116, one or more sensors 120, and rescue confirmation generator 122 of FIG. 1).

In the first distress alert system 100A, microprocessor 104A is communicatively coupled to receiver transmitter 102A, memory 105A, receiver 108A, distress signal display 110A, distress signal generator 112A, location information component 116A, one or more sensors 120A, and rescue confirmation generator 122A. Microprocessor 104A receives one or more incoming rescue signals from receiver 108A and receives a distress signal from distress signal generator 112A and/or one or more sensors 120A. Microprocessor 104A transfers an outgoing distress signal to transmitter 102A. Microprocessor may transfer to, and/or receive from, memory 105A a distress signal, an outgoing distress signal, an outgoing rescue signal, a confirmation rescue signal and/or location information. Microprocessor 104A may also transfer to, and/or receive from, location information component 116A location information.

In the second distress alert system 100B, microprocessor 104B is communicatively coupled to receiver transmitter 102B, memory 105B, receiver 108B, distress signal display 110B, signal generator 112B, location information component 116B, one or more sensors 120B, and rescue confirmation generator 122B. Microprocessor 104B receives an outgoing distress signal from receiver 108B. Microprocessor 104B transfers location information to distress signal display 110B and generates and transfers an outgoing rescue signal or denial rescue signal to transmitter 102B. Memory 105B may receive the outgoing distress signal, the outgoing rescue signal and/or location information from microprocessor 104B and/or transmit the same information to microprocessor 104B. Location information component 116B may also transmit location information to microprocessor 104B and/or receive location information from microprocessor 104B.

Figure 3:
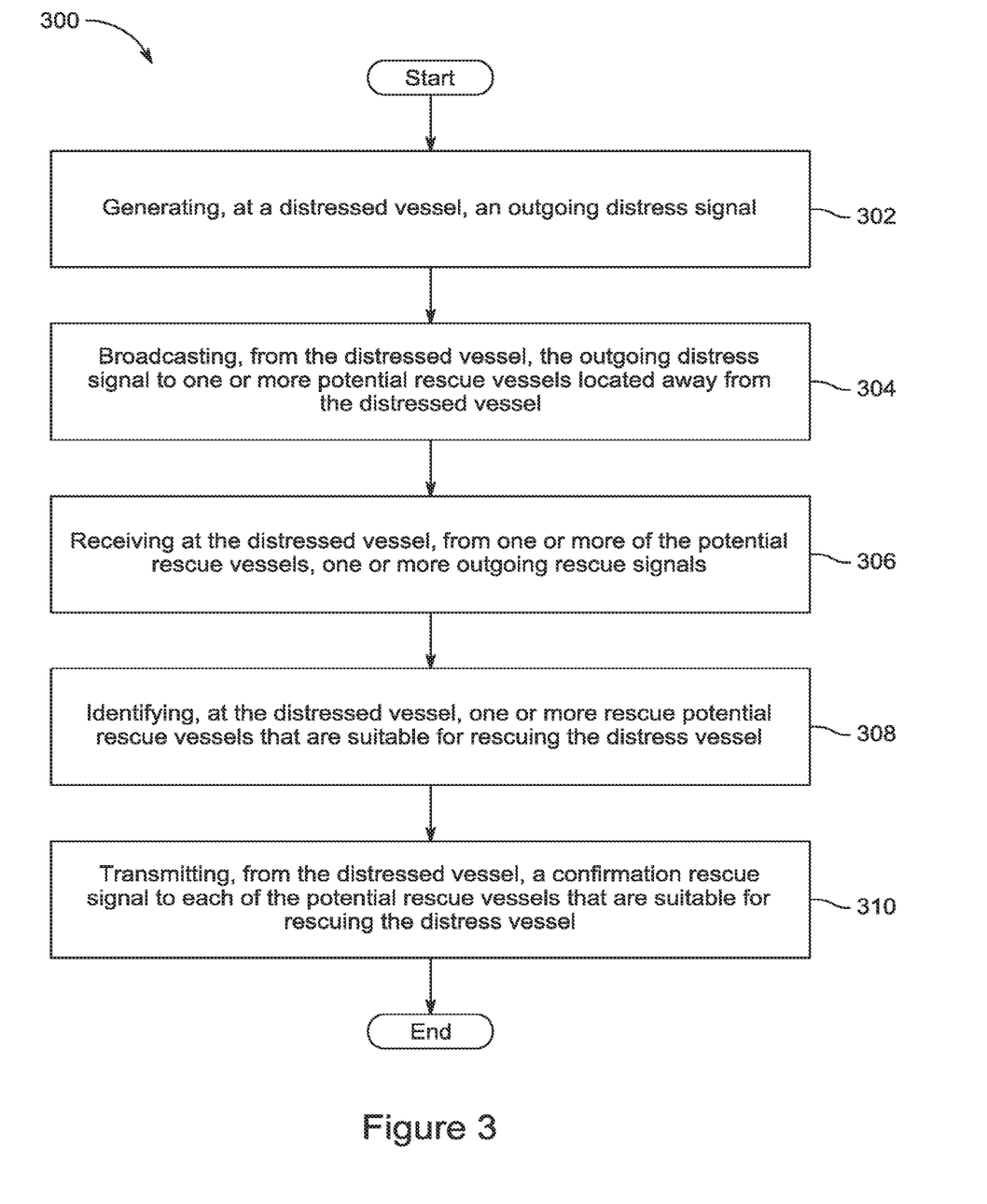
FIG. 3 shows process flow diagram for initiating a rescue, according to one embodiment of the present arrangements, using the distress alert system of FIG. 1.

The present teachings offer, among other things, different processes of initiating and responding to an outgoing distress signal, FIG. 3 shows a process of initiating a rescue of a distressed vessel, according to one embodiment of the present teachings, using a distress alert system (e.g., distress alert system 100A of FIG. 2) coupled to the distressed vessel. Method 300 includes a step 302, which includes generating, at the distressed vessel, an outgoing distress signal.

Step 302 includes, in one embodiment of the present teachings, engaging a distress signal generator (e.g., distress signal generator 112A of FIG. 2) to produce a distress signal that conveys that the vessel is in distress. In another embodiment of the present teachings, step 302 includes producing a distress signal, using one or more sensors (e.g., one or more sensors 120A of FIG. 2), that conveys the vessel is in distress. The one or more sensors automatically produces the distress signal when a measurement exceeds a predefined threshold value and does not need be initiated by personnel on the vessel. The distress signal includes at least one information chose from a group comprising nature of the distress on the distressed vessel, vessel type of digressed vessel (e.g., make and/or model of the vessel), number of persons on the distressed vessel, and identification code of the distressed vessel. Moreover, distress signal may be a continuous signal or an intermittent distress signal.

A microprocessor (e.g., microprocessor 104A of FIG. 2) receives the distress signal from the distress signal generator or one or more sensors and receives distressed vessel location information from a location information component (e.g., location information component 116A of FIG. 2). The microprocessor couples the distress signal with distressed vessel location information to produce an outgoing distress signal. Next, the microprocessor conveys the outgoing distress signal a transmitter (e.g., transmitter 102A of FIG. 2) and/or the location information component. In another embodiment of the present arrangements, the microprocessor also transmits the digress signal, the distressed vessel location information and/or the outgoing distress signal to memory (e.g., memory 105A of FIG. 2). Information stored in memory may be retrieved at a later time to create a vessel location database of one or more distressed vessels.

Next, a step 304 is carried out. Step 304 includes broadcasting, from the transmitter and/or location information component of the distressed vessel, the outgoing distress signal of step 302. In one embodiment of the present teachings, the transmitter broadcasts the outgoing distress signal to one or more potential rescue vessels located away from the distressed vessel. The present teachings are not limited to a range or how far the transmitter may broadcast an outgoing distress signal. Depending on a type of transmitter (e.g., a power value associated with a radio transmitter that determines the radio's broadcast range) broadcasting may be any range from about one hundred feet to a distance between the distressed vessel and a satellite orbiting the earth. The transmitter may broadcast the outgoing distress signal directly to one or more potential rescue vessels, or the transmitter may broadcast the outgoing distress signal to an intermediary (e.g., a nearby vessel), which then broadcasts the outgoing distress signal to one or more potential rescue vessels. In another embodiment of the present teachings, the location information component broadcasts the outgoing distress signal to one or more location information satellites, which then broadcast the outgoing distress signal to one or more potential rescue vessels that are located proximate to the distressed vessel. In yet another embodiment of the present teachings, step 204 includes broadcasting the outgoing distress signal to a land-based entity.

Then the process proceeds to step 306. This step 306 involves receiving, at a receiver (e.g., receiver 108A of FIG. 2) of the distressed vessel, one or more incoming rescue signals. The one or more incoming rescue signals originate from one or more potential rescue vessels and include potential rescue vessel location information (e.g., longitude and latitude of the potential rescue vessel). In one embodiment of the present teachings, the potential rescue vessel location information further includes at least one information chosen from a group comprising vessel type of potential rescue vessel, personnel transporting capacity of the potential rescue vessel, identification code of the potential rescue vessel, fuel level of the potential rescue vessel, and top speed of the potential rescue vessel.

Following step 306, step 308 is implemented and includes identifying, at the distressed vessel, one or more potential rescue vessel that is suitable for rescue. The microprocessor (e.g., microprocessor 104A of FIG. 2) of distressed vessel retrieves the outgoing rescue signal from the receiver and extracts rescue vessel location information. To identify one or more potential rescue vessels the microprocessor may use the potential rescue vessel location information, distressed vessel location information and/or information associated with the distress signal of the distressed vessel.

The microprocessor identifies, in one embodiment of the present teachings, one or more potential rescue vessels that are suitable for rescue based on their proximity to the distressed vessel. By way of example, the microprocessor compares distressed vessel location information to potential rescue vessel information to identify the potential rescue vessel with the shortest distance between the distressed vessel and the potential rescue vessel. The distressed vessel generates a confirmation rescue signal for that potential rescue vessel. By way of another example, the microprocessor computes, for each potential rescue vessel, a difference between the distressed vessel location information and the potential rescue vessel information to arrive at a difference value. The difference value of a potential rescue vessel is compared to a predefined threshold value, which is retrieved from memory. If the difference value of a potential rescue vessel is lower than the predefined threshold, the microprocessor generates a confirmation rescue signal. If however, the difference value is greater than the predefined threshold, the microprocessor generates a denial rescue signal. Thus, one or several potential rescue vessels may be identified by the microprocessor. In one embodiment of the present teachings, the predefined threshold is a value that is less than about 25 miles. In one preferred embodiment of the present teachings, the predefined threshold is a value that is less than about 5 miles. In another preferred embodiment of the present teachings, the predefined threshold has a value that ranges from about 0.1 miles to about 5 miles. In a more preferred embodiment of the present teachings, the predefined threshold is a value that is less than about 2 miles.

In another embodiment of the present teachings, the microprocessor identifies one or more potential rescue vessels that are suitable for rescue using a rescue distance value and a potential rescue vessel size value. The rescue distance value a sum of a distance a potential rescue vessel travels to intercept the distressed vessel and a distance the potential rescue vessel travels, after rescuing the distressed vessel or personnel on the distressed vessel, to reach a safe offloading location (e.g., a dock).

By way of example, each potential rescue vessel size value is compared to the distressed vessel size value. For each potential rescue vessel, if the potential rescue vessel size value greater than or equal the distressed vessel size value, then the potential rescue vessel is added into a potential rescue vessel list. From the potential rescue vessel list, the potential rescue vessel with the shortest distance rescue distance is selected and a confirmation rescue signal is generated for that vessel.

By way of another example in which the rescue distance value and the potential rescue vessel size value are used, the microprocessor ranks one or more potential rescue vessels, from shortest rescue distance value to longest rescue distance value. The microprocessor identifies the potential rescue vessel that has the shortest rescue distance value and has a potential rescue vessel size value that is equal to or greater than the size value of the distressed vessel. The distressed vessel transmits an outgoing rescue signal to the potential rescue vessels that meet both of these requirements.

By way of yet another example in which the rescue distance value and the potential rescue vessel size value are used, the microprocessor ranks one or more potential rescue vessels, from shortest rescue distance value to longest rescue distance value. If the potential rescue vessel with the shortest rescue distance value has a potential rescue vessel size value that is greater than or equal to the distressed vessel size value, then the microprocessor generates a confirmation rescue signal for this potential rescue vessel. If, however, the potential rescue vessel with the shortest rescue distance value has a potential rescue vessel size value that is less the size of the distressed vessel, then the potential rescue vessel with the second shortest rescue distance value is included in the comparison with the distressed vessel size value. In other words, the sum of the potential rescue vessel size values of the shortest rescue distance value and the second shortest rescue distance value is compared to the distressed vessel size value. If necessary, additional potential rescues vessels are added, in order of shortest rescue distance, until a sum of the potential rescue vessel size values is greater than or equal to the distressed vessel size value.

The examples described above use a rescue distance value and the potential rescue vessel size value to identify one or more potential rescue vessels that are suitable for rescuing the distressed vessel. The present teachings, however, are not so limited. In another embodiment of the present teachings, the potential rescue vessel size value may be replaced with a personnel capacity value within a potential rescue vessel. The personnel capacity value is the number of personnel the potential rescue vessel may add to the vessel, without compromising its own safety. Additional potential rescue vessels are identified until all the personnel capacity of the one or more potential rescue vessel is greater than or equal to the personnel capacity of the distressed vessel. To this end, the number of personnel in need of rescue in the distressed vessel is compared to the personnel capacity value of one or more potential rescue vessels to ensure that all personnel are rescued from the distressed vessel.

Next, a step 310 includes transmitting, from a transmitter (e.g., transmitter 108A of FIG. 2) of the distressed vessel, a confirmation rescue signal to each of the potential rescue vessels that are suitable for rescuing the distressed vessel. Transmitting may also include transmitting the confirmation rescue signal to a land-based entity.

Figure 4:
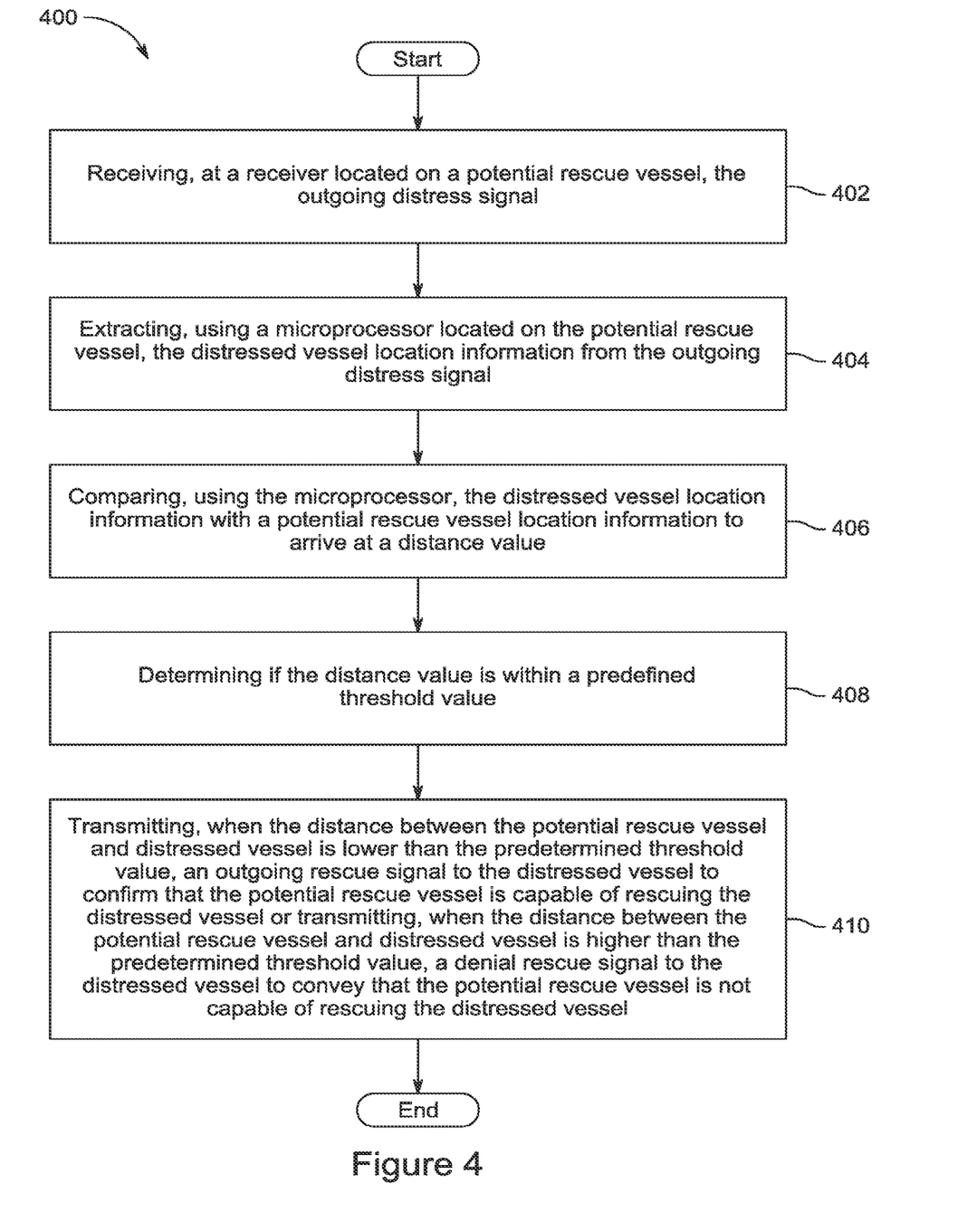
FIG. 4 shows a process flow diagram for processing, at a potential rescue vessel, an outgoing distress signal, according to one embodiment of the present arrangements, using the distress alert system of FIG. 1.

The processes described above, which include broadcasting an outgoing distress signal, relate to the distressed vessel. The present teachings also provide processes for processing, at a potential rescue vessel, the outgoing distress signal, FIG. 4 shows a process of processing an outgoing distress signal, according to one embodiment of the present teachings. Method 400 includes a step 402, which includes receiving, at a receiver (e.g., receiver 108B of FIG. 2) of distress alert system (e.g., distress alert system 100B of FIG. 2), the outgoing distress signal. This distress alert system is located on a potential rescue vessel. As described above, the outgoing distress signal is transmitted from a distressed vessel and includes a distress signal and distressed vessel location information.

Next, a step 404 is carried out. Step 404 includes extracting the distressed vessel location information from the outgoing distress signal. A microprocessor (e.g., microprocessor 104B) receives the outgoing distress signal from the receiver and extracts the distressed vessel location information. The microprocessor may transmit the outgoing distress signal and/or distressed vessel location information to memory (e.g., memory 105B of FIG. 2).

Then, the method proceeds to step 406. This step involves comparing the distressed vessel location information to the potential rescue vessel location to arrive at a distance value. In one embodiment of the present teaching, the microprocessor compares longitude and/or latitude information contained in the distressed vessel location information and the longitude and/or latitude information contained in the location information of the distressed vessel. With this information, the microprocessor determines the distance value and/or direction of emanation of the outgoing distress signal. The distressed vessel location information, distance value and/or direction of emanation of the outgoing distress signal may be stored in memory and used, in conjunction with additional information of the same type, to identify high risk geographic locations from which multiple outgoing distress signals have been broadcast.

Following step 406, step 408 is implemented and includes determining if the distance value is within a predefined threshold value. In this step, the microprocessor obtains the potential rescue vessel's location information from a location information component (e.g., location information component 116B of FIG. 2) or it may be stored, temporarily and/or permanently, in memory. In a preferred embodiment of the present teachings, the predefined threshold value is a radius value extending from the distressed vessel. The microprocessor compares the predefined threshold value to the potential rescue vessel's own location information.

Next, a step 410 includes transmitting, when the distance between the potential rescue vessel and the distressed vessel is lower than the predefined threshold value, an outgoing rescue signal to the distressed vessel. The outgoing rescue signal provides confirmation that the potential rescue vessel is capable of rescuing the distressed vessel. If, however, the distance between the potential rescue vessel and the distressed vessel is higher than the predefined threshold value, then step 510 includes transmitting a denial rescue signal to the distressed vessel. The denial rescue signal informs the distressed vessel that the potential rescue vessel is not capable of rescuing the distressed vessel.

In another embodiment of the present teachings, steps 404, 406, 408, and 410 are omitted. Instead, after step 402, the potential rescue vessel transmits an outgoing rescue signal to the distressed vessel indicating that the potential rescue vessel is capable of rescuing the distressed vessel. In this embodiment, the outgoing rescue signal, includes the potential vessel location information. As described above in relation to FIG. 3, the distressed vessel determines which one or more potential rescue vessel is best suited to perform the rescue. This embodiment may also include a step of displaying the distressed vessel location and/or direction of the distressed vessel on a distress signal display (e.g., distress signal display 110B of FIG. 2).

Figure 5:
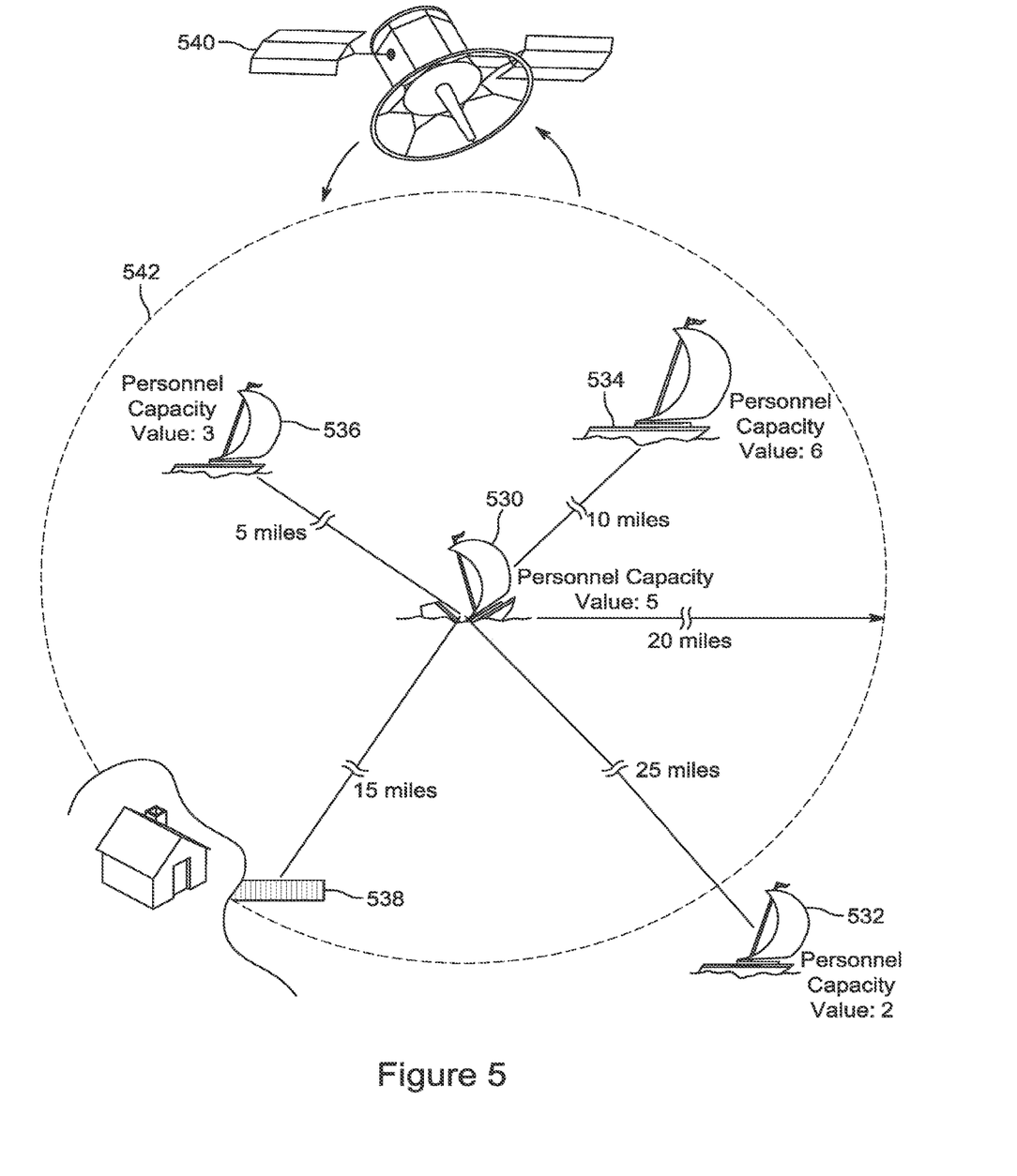
FIG. 5 shows a perspective view of a distressed vessel that has broadcast an outgoing rescue signal and three potential rescue vessels that have received the outgoing rescue signal.

FIG. 5 shows a potential rescue scenario of a distressed vessel 530, A first potential rescue vessel 532, a second potential rescue vessel 534, and third potential rescue vessel 536 are located at various distances away from distressed vessel 530. Distressed vessel 530, using a distress alert system (e.g., distress alert system 100A of FIG. 2) generates and broadcasts an outgoing distress signal to all potential rescue vessels in the vicinity of distressed vessel 530. The outgoing distress signal may be broadcast directly to first potential rescue vessel 532, second potential rescue vessel 534, and third potential rescue vessel 536, each of which has distress alert systems and receive the outgoing distress signal. The outgoing distress signal may also be broadcast to satellite 540, which transmits the outgoing distress signal to first potential rescue vessel 532, second potential rescue vessel 534, and third potential rescue vessel 536.

Each of first potential rescue vessel 532, second potential rescue vessel 534, and third potential rescue vessel 536 calculate a distance value—i.e., a distance between distressed vessel 530 and the potential rescue vessel and compares the distance value to a predefined threshold value 542 of 20 miles. As shown in FIG. 5, second potential rescue vessel 534, having a distance value of 10 miles, and third potential rescue vessel 536, having a distance value of 5 miles, has distance values that are less than the predefined threshold 542 of 20 miles. Second potential rescue vessel 534 and third potential rescue vessel 536 each transmit an outgoing rescue signal to distressed vessel 530, which informs distressed vessel 530 that either vessel is capable of rescuing distressed vessel 530. First potential rescue vessel 532, which has a distance value of 25 miles this is greater than the predefined threshold, transmits a denial rescue signal to distressed vessel 530.

Distressed vessel 530 receives the outgoing rescue signal from second potential rescue vessel 534 and third potential rescue vessel 536. In one embodiment of the present teachings, distressed vessel 530 transmits a confirmation rescue signal to both second potential rescue vessel 534 and third potential rescue vessel 536. Second potential rescue vessel 534 and/or third potential rescue vessel 536 may then come to the rescue of distressed vessel 530.

In another embodiment of the present teachings, however, distressed vessel 530 is more selective in determining to which potential rescue vessel it will send a confirmation rescue signal. Distressed vessel 530 determines which of second potential rescue vessel 534 and third potential rescue vessel 536 has the shorted rescue distance—i.e., the sum of a distance a potential rescue vessel travels to intercept distressed vessel 530 and a distance the potential rescue vessel travels, after rescuing distressed vessel 530 or personnel on distressed vessel 530, to reach a safe offloading location 538. In this embodiment, second potential rescue vessel 534 has a rescue distance of twenty-five miles (i.e., 10 miles between second potential rescue vessel 534 and distressed vessel 530+15 miles between distressed vessel 530 and offloading location 538=25 miles). Third potential rescue vessel 536 has a rescue distance of twenty miles (i.e., 5 miles between third potential rescue vessel 536 and distressed vessel 530+15 miles between distressed vessel 530 and offloading location 538=20 miles).

Starting with third potential rescue vessel 536, which as the shortest rescue distance, distressed vessel 530 compares the number of personnel on distressed vessel 530 (i.e., 5 distressed personnel) to a personnel capacity value of third potential rescue vessel 536. In this example, third potential rescue vessel 536 has a personnel capacity value of three, which is less than the number of personnel that need to be rescued 3<5). Third potential rescue vessel 536, on its own, cannot rescue all the distressed personnel. Thus, the personnel capacity value of second potential rescue vessel 534 is added to the personnel capacity value of third potential rescue vessel 536 and the sum is compared to the number of distressed personnel. Here, the sum of personnel capacity value of second potential rescue vessel 534 and the personnel capacity value of third potential rescue vessel 536 is greater than or equal to the number of distressed personnel (i.e., 3+6≥5). The distressed vessel 530, in this example, transmits an outgoing rescue signal to both second potential rescue vessel 534 and third potential rescue vessel 536.

Second potential rescue vessel 534 and third potential rescue vessel 536 receive, at a distress alert system, the outgoing rescue signal. The distress alert system displays, on a distress signal display, a direction of distressed vessel 530. In one embodiment of the present teachings, second potential rescue vessel 534 and/or third potential rescue vessel 536 engage a rescue confirmation generator, which creates a rescue confirmation signal. Distressed vessel 530 receives the rescue confirmation signal and personnel on the distressed vessel 530 are notified that a potential rescue vessel is coming to rescue distressed vessel 530. By way of example, a distress signal display (e.g. distress signal display 110A of FIG. 2) illustrates the direction from which second potential rescue vessel 534 and/or third potential rescue vessel 536 are arriving.

Although illustrative embodiments of the arrangements and teaching have been shown and described, other modifications, changes, and substitutions are intended. Accordingly, it is appropriate that the appended claims be construed broadly and in a manner consistent with the scope of the disclosure, as set forth in the following claims.

The invention claimed is:

1. A process for processing an outgoing distress signal from a distressed vessel, said process comprising:
   receiving, at a receiver located on a potential rescue vessel, said outgoing distress signal directly from said distressed vessel wherein said outgoing distress signal includes a distressed vessel location information;
   extracting, using a microprocessor located on said potential rescue vessel, said distressed vessel location information from said outgoing distress signal;
   comparing, using said microprocessor, said distressed vessel location information with a potential rescue vessel location information to arrive at a distance value, and wherein said potential rescue vessel location information conveys location information of said potential rescue vessel;
   determining if said distance value is within a predefined threshold value; and
   transmitting, when said distance between said potential rescue vessel and distressed vessel is lower than said predefined threshold value, an outgoing rescue signal directly to said distressed vessel to confirm that said potential rescue vessel is capable of rescuing said distressed vessel or transmitting, when said distance between said potential rescue vessel and distressed vessel is higher than said predefined threshold value, a denial rescue signal directly to said distressed vessel to convey that said potential rescue vessel is not capable of rescuing said distressed vessel.

2. The process for processing said outgoing distress signal from said distressed vessel of claim 1, wherein in said comparing, said microprocessor compares latitude and/or longitude information contained in said potential rescue vessel location information and contained in said distressed vessel location information to ascertain direction of emanation of said outgoing distress signal.

3. The process for processing said outgoing distress signal from said distressed vessel of claim 1, further comprising storing, using memory, plurality of location information of emanation of a plurality of said outgoing distress signals to identify high risk locations that have multiple outgoing distress signals.

4. The process for processing said outgoing distress signal from said distressed vessel of claim 1, further comprising storing, transmitting said confirmation rescue signal to a land-based entity.

5. The process for processing said outgoing distress signal from said distressed vessel of claim 1, further comprising transmitting a rescue signal confirmation confirming that said potential rescue vessel will attempt a rescue of said distressed vessel.

6. The process for processing said outgoing distress signal from said distressed vessel of claim 1, wherein said distress signal includes at least one information chosen from a group comprising nature of distress of said distressed vessel, type of said distressed vessel, number of persons on said distressed vessel and identification code of said distressed vessel.

7. The process for processing said outgoing distress signal from said distressed vessel of claim 1, wherein said potential rescue vessel location information includes at least one information chosen from a group comprising vessel type of said potential rescue vessel, personnel capacity of said potential rescue vessel, identification code of said potential rescue vessel, fuel level of said potential rescue vessel and top speed of said potential rescue vessel.

8. The process for processing said outgoing distress signal from said distressed vessel of claim 1, wherein said predefined threshold value is a value that ranges from about 0.1 miles and about 25 miles.

\* \* \* \* \*